United States Patent [19]

Mehrgardt

[11] Patent Number: 4,709,270

[45] Date of Patent: Nov. 24, 1987

[54] CIRCUIT ARRANGEMENT FOR FILTERING AND DEMODULATING A SIGNAL FREQUENCY-MODULATOR WITH AT LEAST ONE AUDIO SIGNAL

[75] Inventor: Soenke Mehrgardt, March, Fed. Rep. of Germany

[73] Assignee: Deutsche ITT Industries GmbH, Freiburg, Fed. Rep. of Germany

[21] Appl. No.: 869,237

[22] Filed: Jun. 2, 1986

[30] Foreign Application Priority Data

Jun. 1, 1985 [EP] European Pat. Off. ........ 85106767.8

[51] Int. Cl.⁴ .......................... H04N 5/44; H04N 5/60
[52] U.S. Cl. .................................... 358/188; 358/198; 329/110; 329/112; 381/3
[58] Field of Search ............... 358/143, 144, 188, 189, 358/197, 198; 329/110, 112; 455/205, 214, 337, 339, 340; 381/3

[56] References Cited

U.S. PATENT DOCUMENTS

| | | | |
|---|---|---|---|
| 4,139,866 | 2/1979 | Wegner | 358/198 |
| 4,158,858 | 6/1979 | Janssen | 358/198 |
| 4,496,979 | 1/1985 | Yu et al. | 358/198 |

Primary Examiner—James J. Groody
Assistant Examiner—Michael D. Parker
Attorney, Agent, or Firm—T. L. Peterson

[57] ABSTRACT

A digital television receiver circuit filters and demodulates a signal contained in the input signal of the television receiver and frequency-modulated with at least one audio signal. The only A/D converter required in the circuit is the converter for changing the video signal from analog to digital form. The circuit uses digital filters, a digital mixer, decimation stages and a digital frequency demodulator stage to separate the audio signal from the composite video signal.

3 Claims, 14 Drawing Figures

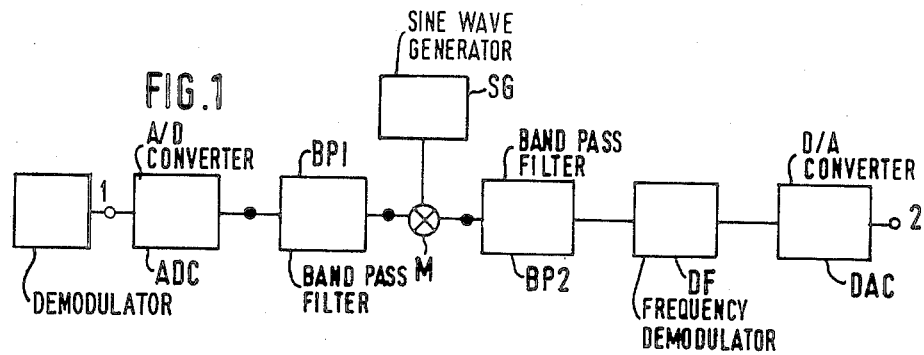
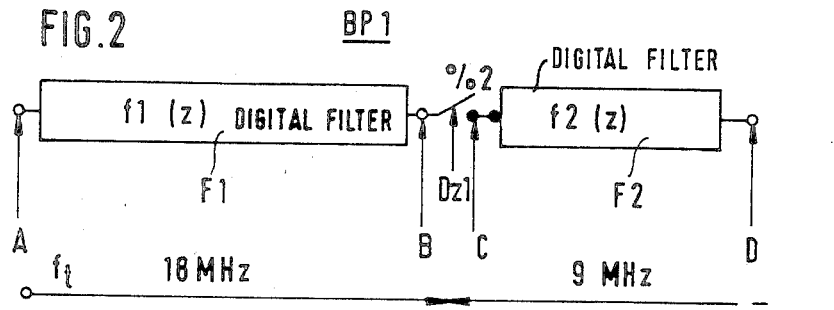
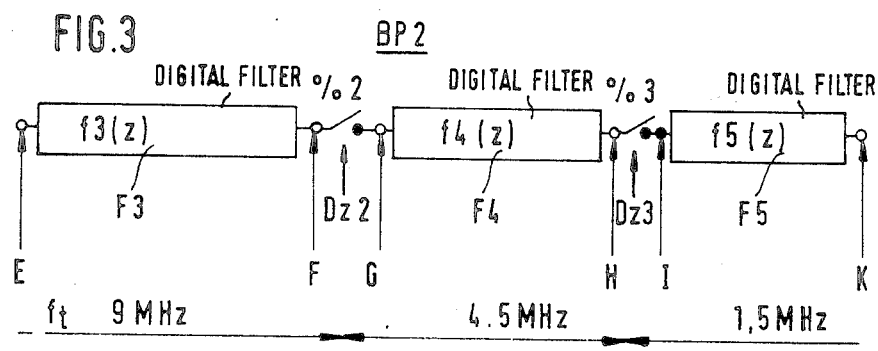
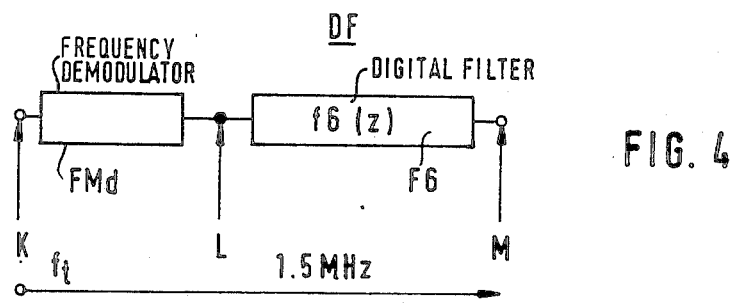

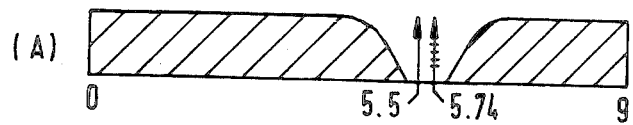
FIG. 5A
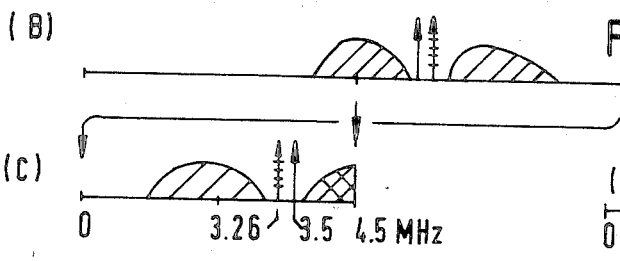
FIG. 5B
FIG. 5C
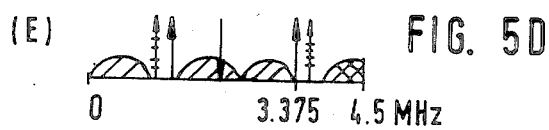
FIG. 5D
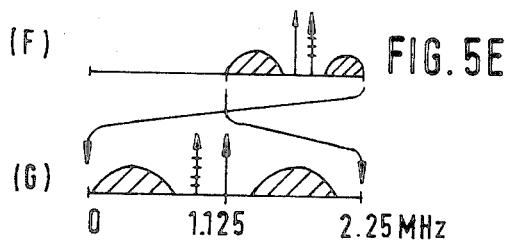
FIG. 5E
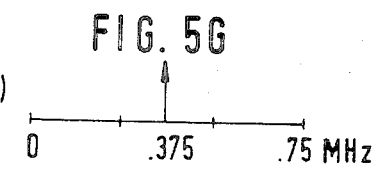
FIG. 5G
FIG. 5H
FIG. 5I
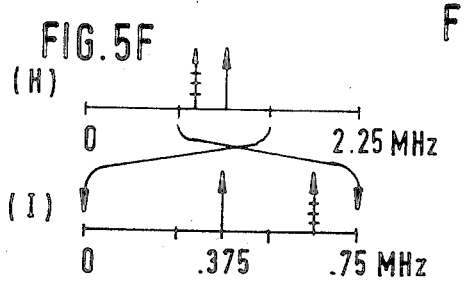
FIG. 5F
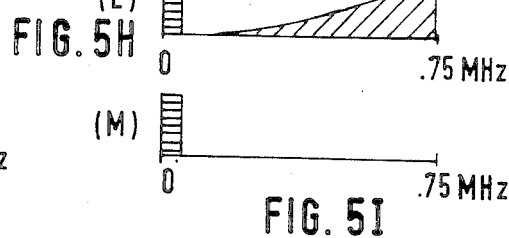
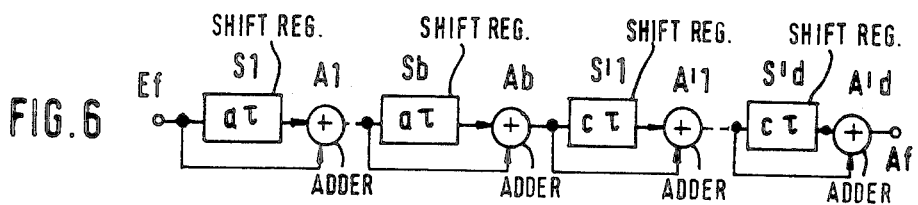
FIG. 6

CIRCUIT ARRANGEMENT FOR FILTERING AND DEMODULATING A SIGNAL FREQUENCY-MODULATOR WITH AT LEAST ONE AUDIO SIGNAL

BACKGROUND OF THE INVENTION

"Electronics, Aug. 11, 1981, pages 97 to 103, describes a television receiver in which the subcircuit for demodulating the intermediate frequency is followed by two digital subcircuits for converting and processing the audio signal and the composite video signal. The demodulator has an audio-signal output which is coupled to the input of a first A/D converter, and a video-signal output at which only the composite video signal appears. The latter is fed to the input of a second, high-speed A/D converter which is suitable for the composite video signal, i.e., for sampling rates of about 18 MHz. Such high speed A/D converters are commercially available.

The signal appearing at the input of the television receiver is frequency-modulated with at least one audio signal, or in the presence of a stereo transmission, with two audio signals. The amplified input signal must be demodulated and filtered to obtain a first signal, containing only the audio signal, and a second signal, containing only the composite video signal. To this end, the prior art television receiver uses analog filters before the analog-to-digital conversion, so that division into an audio channel and a composite video channel takes place prior to the conversion.

The invention relates to such a circuit arrangement for filtering and demodulating a signal, frequency-modulated with at least one audio signal and contained in an input signal of a television receiver having a demodulator whose output is coupled to the input of an A/D converter suitable for converting a video signal from analog to digital form.

The prior arrangement has the disadvantage of requiring analog filters in the demodulator and two different A/D converters, which are relatively costly.

SUMMARY OF THE INVENTION

One object of the invention is to provide a monolithic integrable circuit arrangement which requires only a single A/D converter.

The invention is thus based on the idea of applying the television receiver's amplified input signal, which still contains the audio component, to the input of the A/D converter hitherto used only to convert the video signal from analog to digital form, and to separate the audio signal from the composite video signal using digital filters that are known per se. This eliminates the need for the analog filters contained in the demodulator of the prior arrangement.

BRIEF DESCRIPTION OF THE DRAWING

The invention and a preferred embodiment thereof will now be explained with reference to the accompanying drawings, in which:

FIG. 1 is a block diagram of the circuit arrangement in accordance with the invention;

FIGS. 2 to 4 serve to explain the filter characteristics of the preferred embodiment of the circuit arrangement in accordance with the invention;

FIGS. 5A–5I shows qualitatively the amplitude spectra of the signals developed between the points A to M of the circuit is of FIGS. 2 to 4, and FIG. 6 serves to explain the design of digital filters.

DETAILED DESCRIPTION

The circuit arrangement of FIG. 1 has on input 1 which is supplied with the demodulated, amplified input signal of the television receiver, which appears at the output of the demodulator of the television receiver. This signal at the input 1 thus consists of the composite video signal and the signal frequency-modulated with an audio signal or, in the case of a stereo signal, with two audio signals. Input 1 is coupled to the input of the A/D converter ADC for converting the video signal from analog to digital form. The A/D converter ADC can be the A/D converter section of the commercially available monolithic integrated converter UVC 3100, which is described in the periodical "Elektronik" of Apr. 4, 1985, pages 98 to 100.

The output signal of the A/D converter ADC is fed to the input of the digital band-pass filter stage BP1, which can be implemented as shown in the preferred embodiment of FIG. 2. In this embodiment, this digital band-pass filter stage BP1 consists of two digital filters F1 and F2 between which the decimation stage Dz1 has been inserted, which is operated at half the clock frequency. The decimation of digital signals by means of suitable decimation stages is described in "Proceedings of the IEEE", Vol. 69, No. 3 (March 1981), pages 300 to 331.

The transfer functions of the filters as a F1 and F2 function of the complex variable z may be calculated. As is well known, $$z = e^{i\Omega}$$

where
$\Omega = (f/f_t)$ and
$f_t$ = clock frequency.

In the preferred embodiment, these functions are given by $$f1(z) = (1-z^{-1})^6 \cdot 1 + z^{-3})^2 \cdot (1+z^{-4}) \cdot (1-z^{-5})$$

$$f2(z) = f3(z) = (1-z^{-1})^6 \cdot (1+z^{-3})^2$$

$$f4(z) = f5(z) = (1+z^{-10}) \cdot (1-z^{-12}) \cdot (1+z^{-14})/(1+z^{-2})^3$$

and $$f6(z) = (1+z^{-1})^4 \cdot (1+z^{-2})^3 \cdot (1+z^{-4})^3$$

This forms the basis for the circuit design of the digital filters (see also FIG. 6).

Since the sampling frequency is considerably higher than the highest audio frequency—in the embodiment: 18 MHz, corresponding to the PAL frequency of 17.8 MHz—, there is no information loss. However, this has the advantage that, in the mixer stage following the band-pass filter stage BP1 and containing the multiplier M and the digital sine-wave generator SG, only the easier-to-handle reduced clock frequency of 9 MHz has to be processed. The design of a digital sinewave generator in combination with a constant multiplier which obtains the coefficients required to realize a sine function from a read-only memory is generally known and, therefore, will not be explained here.

The reduction of the clock frequency ahead of the mixer stage has the advantage that, in the embodiment, the digital sine-wave generator SG can be switched between two frequencies at a rate of 18 MHz, so that not only a first signal at 5.5 MHz, frequency-modulated with a first audio signal, but also a second audio signal, can be further processed.

The output of the mixer stage is coupled to the input of a second digital band-pass filter stage BP2, which contains at least one decimation stage. In the circuit of FIG. 1, the second digital band-pass filter stage BP2 is followed by the digital frequency demodulator stage DF. In the preferred embodiment of FIG. 3, the second digital band-pass filter stage BP2 is implemented with three series-connected digital filters F3, F4, and F5 and two decimation stages Dz2 and Dz3 inserted between the digital filters, the decimation stages decimating by the frequency division factors 2 and 3, respectively. The clock rate at the output of the second digital bandpass filter stage BP2 is thus 1.5 MHz, as indicated in FIG. 3.

The output of the second digital band-pass filter stage BP2 of FIG. 1 is coupled to the input of the second frequency demodulator stage DF, which, in the preferred embodiment of FIG. 4, contains the digital frequency demodulator FMd and the digital filter F6. A digital frequency demodulator that can be used in the circuit arrangement according to the invention is disclosed in DE-OS No. 31 38 464.

The output 2, which provides the audio signal, is preceded by the D/A converter DAC, whose input is connected to the output of the frequency demodulator stage DF. The D/A conversion can be done with the D/A converter section of the integrated converter UVC 3100, which is described in the periodical "Elektronik" of Apr. 4, 1985 pages 98 to 100.

Graphs A to M of FIGS. 5A to 5I illustrate the amplitude-frequency characteristics of the signal spectra at the circuit points A to M of FIGS. 2 to 4 for a circuit arrangement in accordance with the invention which is suited for filtering and demodulating a two-channel audio signal as is contained in the input signal of a PAL television receiver frequency-modulated with two audio signals. The carriers of the two audio signals are at 5.5 MHz and 5.74 MHz, as shown in graph A of FIG. 5A. Graphs B and C of FIG. 5B illustrate the decimation of the signal between the circuit points (B) and (C) of FIG. 2. The frequency responses at the output of the digital filter F2 and behind the mixer stage at point (E) are shown in graphs D and E of FIGS. 5C and 5D, respectively. The digital sine-wave generator SG is switched between two frequencies at 18 MHz. In the preferred embodiment of the invention, the portion behind the mixer stage is operated in time-division multiplex. The frequency response at the input of the digital filter F3 is shown in graph E of FIG. 5D. After being filtered by the digital filter F3, the signal is decimated by a factor of 2, as shown in graphs F and G of FIG. 5E. Filtering in the digital filter F4, which is operated at a clock rate of 4.5 MHz in the preferred embodiment, is followed by a further decimation by a factor of 3, as shown in graphs H and I of FIG. 5F Graph K of FIG. 5G illustrates the filtering-out of one of the audio-signal carriers by means of the digital filter F5. Graph L of FIG. 5H illustrates the action of the frequency demodulator FMd and the action of the digital filter F6, at the output of which the frequency response M is as shown in FIG. 5I.

From the output signal of the filter F6, one of the audio signals is derived by A/D conversion. The same applies analogously to the other audio signal.

The transfer function of the digital filters given in FIGS. 2 to 4 can be realized with shift registers and adders in a manner known per se, as shown in FIG. 6 by way of example for the transfer function $$f(z) = (1 + z^{-a})^b \cdot (1 + z^{-c})^d$$

The filter structure of FIG. 6 thus consists of a series combination of shift registers S1 ... S'd each having it output coupled to an adder A1 ... A'd, whose second input is connected to the input of the associated shift register. Accordingly, the exponents a and c indicate the delays of the individual shift registers, and the exponents b and d the number of series-connected shift-register/adder pairs of the filter structure, which consists of two subnetworks in the embodiment.

The circuit arrangement in accordance with the invention, besides being suited to monolithic integration, has the advantage that the transfer function depends essentially only on the clock frequency $f_t$, which can be maintained constant with very close accuracy, and which will hardly be temperature-dependent if a crystal oscillator is used. In addition, the circuit eliminates the need for one A/D converter, namely that for converting the audio signal.

Another advantage of the circuit arrangement in accordance with the invention lies is that processing, at least up to the digital frequency demodulator stage, can be performed with only few bits without an appreciable loss of sound quality, because the audio signal in contained in a frequency-modulated signal rather than an amplitude-modulated signal. Thus, as few as 2 to 4 bits before the band-pass filter BP1 and 4 to 8 bits between the multiplier M and the bandpass filter BP2 are sufficient to achieve a satisfactory sound quality.

What is claimed is:

1. A circuit arrangement for filtering and demodulating a television signal which is frequency modulated with at least one audio signal, said circuit arrangement comprising:
    a demodulator;
    an analog-to-digital converter for converting a video signal from analog to digital form, said analog to digital converter having its input coupled to said demodulator;
    a mixer stage comprising a multiplier having a first input coupled to a digital sine-wave generator, having a second input and having an output;
    a first digital bandpass filter stage coupling the output of said analog-to-digital converter to said multiplier second input;
    a frequency demodulator stage having an input and an output;
    a second digital band-pass filter stage containing at least one decimation stage and coupling said multiplier output to said frequency demodulator stage input; and
    a digital-to-analog converter coupled to the output of said frequency demodulator stage and having an output for providing said at least one audio signal.

2. A circuit arrangement in accordance with claim 1 wherein:
    said first digital bandpass filter stage comprises at least one decimation stage.

3. A circuit arrangement in accordance with claim 2 wherein:
    said digital sine wave generator is switchable between at least two frequencies.

* * * * *